United States Patent [19]
Johnson et al.

[11] 4,297,016
[45] Oct. 27, 1981

[54] SCANNING SHUTTER BLADE ARRANGEMENT WITH DYNAMIC APERTURES FOR AMBIENT AND FLASH EXPOSURES

[75] Inventors: Bruce K. Johnson, Andover; George D. Whiteside, Lexington, both of Mass.

[73] Assignee: Polaroid Corporation, Cambridge, Mass.

[21] Appl. No.: 166,970

[22] Filed: Jul. 7, 1980

[51] Int. Cl.³ .............................................. G03B 7/08
[52] U.S. Cl. ....................................... 354/27; 354/29; 354/147; 354/230; 354/247
[58] Field of Search ................... 354/26, 27, 29, 30, 354/147, 230, 246, 247

[56] References Cited

U.S. PATENT DOCUMENTS

| | | | |
|---|---|---|---|
| 3,873,987 | 3/1975 | Brauning et al. | 354/26 |
| 3,893,134 | 7/1975 | Brauning et al. | 354/30 |
| 4,005,448 | 1/1977 | Iwata et al. | 354/30 |
| 4,008,481 | 5/1977 | Whiteside | 354/27 |
| 4,023,187 | 5/1977 | Shank | 354/27 |
| 4,047,190 | 9/1977 | Johnson et al. | 354/27 |
| 4,058,817 | 11/1977 | Johnson et al. | 354/26 |
| 4,104,653 | 8/1978 | Johnson et al. | 354/27 |
| 4,118,721 | 10/1978 | Hashimoto | 354/147 |

*Primary Examiner*—Russell E. Adams
*Attorney, Agent, or Firm*—Edward S. Roman

[57] ABSTRACT

An exposure control system for a photographic camera apparatus of the type preferably having a fixed focus and a built-in electronic flash includes a scanning type shutter blade arrangement wherein the shutter blade elements have especially configured scene light admitting apertures which generally scan to an intermediate sized aperture during the predominantly ambient scene lighted mode of operation to provide a correspondingly increased depth of field and which scan to a maximum size aperture during the predominantly artificial scene lighted mode of operation to provide for a maximum effective range for the flash.

14 Claims, 6 Drawing Figures

SCANNING SHUTTER BLADE ARRANGEMENT WITH DYNAMIC APERTURES FOR AMBIENT AND FLASH EXPOSURES

BACKGROUND OF THE INVENTION

This invention relates generally to an exposure control system for a photographic camera apparatus and, more particularly, to an exposure control system preferably for a fixed focus camera having scanning type shutter blade elements with specially configured primary scene light admitting apertures.

In U.S. Pat. No. 4,104,653, entitled "Scanning Shutter Blade Arrangement with Ambient and Flash Ranges", by B. Johnson et al., issued Aug. 1, 1978, there is disclosed an exposure control for a photographic camera of the type preferably having a fixed focus lens. The exposure control comprises a pair of scanning type shutter blade elements for respectively blocking and unblocking the passage of light through an effective exposure aperture to a film plane and to an effective photocell aperture to a light sensing photocell. The shutter blades include overlapping exposure apertures and photocell apertures and are driven by a rotatable member or walking beam which is controlled to move between first and second arrangements or angular limit positions. As the walking beam is displaced from its first arrangement, the overlapping exposure and photocell apertures of the shutter blades cooperate to establish effective exposure and photocell apertures, respectively, which progressively increase as the walking beam is displaced towards its second arrangement in a well-known manner. A spring bias is adapted to urge the walking beam from its first arrangement toward its second arrangement at the beginning of an exposure cycle. A solenoid is provided to return the walking beam to its first arrangement in respose to a scene light integrating network which determines a point in time in an exposure cycle at which the integral of the light incident on a light sensor exceeds a predetermined value corresponding to a select exposure.

An artificial scene lighted mode of operation is provided during the exposure cycle wherein the flash is fired subsequent to the walking beam moving to its second arrangement in which the shutter blades define the maximum effective exposure aperture. The artificial scene light is provided by a linear flash array which may be removably connected to a complementary socket in the camera housing.

In order to take an ambient scene lighted photograph, the flash array must be removed from the camera. Removal of the flash array from the camera, in turn, operates to position a stop member within the locus of travel of the walking beam to interferingly engage the walking beam at a predetermined intermediate arrangement between the first and second arrangements. Thus, during the ambient scene lighted exposure cycle, the shutter blades move in the aforementioned manner defining ever progressively changing effective exposure apertures until the walking beam is engaged by the stop member to define an intermediate sized effective scene light admitting primary aperture which is less than the maximum sized aperture at which the flash is fired in the aforementioned mode of operation. Since the depth of field increases in correspondence with a decrease in the maximum effective exposure aperture, the aforementioned scanning shutter blade arrangement can provide for an increased depth of field during the predominantly ambient scene lighted mode of operation. Such a system is particularly well suited for use with flash lamps which are removably connected to the camera since the stop member operates as a direct function of the removal of the flash lamp from the camera. However, in camera arrangements which have built-in electronic flash systems which are not detachable from the camera, such stop members cannot be automatically actuated. Thus, some provision would have to be made for the photographer to manually actuate the stop member every time the mode of operation of the camera is changed from an artificial scene lighted mode of operation to an ambient scene lighted mode of operation. However, this additional manual manipulation by the photographer not only detracts from a fully automatic exposure control system, but also, if forgotten, may result in a blurred photograph in the ambient scene lighted mode as a result of the reduced depth of field.

Therefore, it is a primary object of this invention to provide an exposure control system for a photographic camera apparatus of the type having a built-in electronic flash wherein the shutter blade apertures are especially configured to generally provide for a reduced maximum aperture size and a correspondingly increased depth of field during the predominantly ambient scene lighted mode of operation.

It is also an object of this invention to provide an exposure control system for a photographic camera apparatus of the type having a built-in electronic flash wherein the shutter blade elements are especially configured to define a maximum size exposure aperture during the artificial scene lighted mode of operation.

It is an even further object of this invention to provide an exposure control system for a photographic camera apparatus of the type having a built-in strobe and a scanning shutter blade arrangement wherein the blades generally scan to an intermediate sized aperture during the predominantly ambient scene lighted mode of operation and to a maximum sized aperture during the predominantly artificial scene lighted mode of operation without the use of a stop member to inhibit movement of the scanning shutter blades.

Other objects of the invention will be in part obvious and will in part appear hereinafter. The invention accordingly comprises a mechanism and system possessing a construction, combination of elements and arrangement of parts which are exemplified in the following detailed disclosure.

SUMMARY OF THE INVENTION

A photographic camera apparatus of the type for use with a source of artificial illumination in either a predominantly artificial scene lighted mode of operation or in a predominantly ambient scene lighted mode of operation and which includes means for mounting photographic film material at a given film plane comprises a blade mechanism together with means for mounting the blade mechanism for displacement along a predetermined path to define a range of differently sized apertures. Means are also included for providing a flash fire signal to ignite the source of artificial illumination at a select time subsequent to the commencement of an exposure interval. Drive means are provided for displacing the blade mechanism along the predetermined path to define the exposure interval. The blade mechanism and the drive means are cooperatively structured and arranged with respect to each other such that for the majority of predominantly ambient scene lighted exposures, the drive means first displaces the blade mechanism from a first closed arrangement wherein it precludes scene light from reaching the film plane toward a second arrangement defining a maximum sized aperture in the aforementioned range of apertures. The drive means then displaces the blade mechanism back toward its first closed arrangement prior to the blade mechanism being displaced beyond a third intermediate arrangement wherein it defines an aperture size substantially less than the maximum aperture size. In addition, for the majority of predominantly artificial scene lighted exposures, the drive means first displaces the blade mechanism from its first closed arrangement to its second maximum aperture size defining arrangement after the select flash fire signal time and then displaces the blade mechanism back to its closed arrangement. The rate at which the aperture sizes increase immediately prior to the blade mechanism being displaced into its third intermediate arrangement from its first arrangement is substantially less than the rate at which the aperture sizes increase immediately subsequent to the blade mechanism being displaced away from its third intermediate arrangement toward its second maximum arrangement.

DESCRIPTION OF THE DRAWINGS

The novel features that are considered characteristic of the invention are set forth with particularity in the appended claims. The invention, itself, however, both as to its organization and its method of operation, together with other objects and advantages thereof will best be understood from the following description of the illustrated embodiment when read in connection with the accompanying drawings wherein:

DESCRIPTION OF THE PREFERRED EMBODIMENTS

Figure 1:
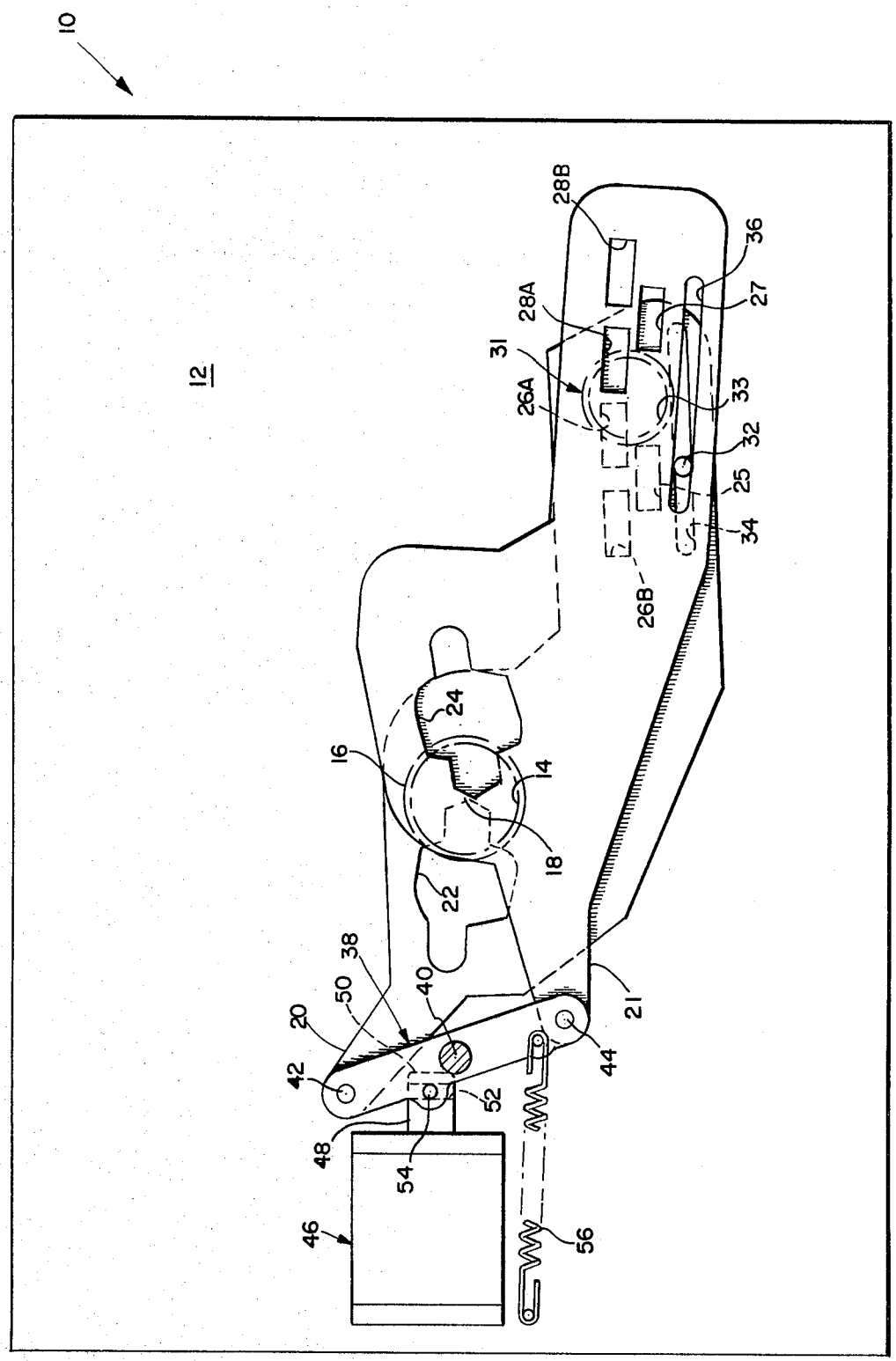
FIG. 1 is a front elevational view showing the shutter blade arrangement of this invention.

Referring now to FIG. 1, there is shown generally at 10 a photographic exposure control apparatus disposed about a baseblock casting 12 which can be selectively machined to support the various components of a photographic exposure control mechanism. Centrally disposed within the baseblock casting 12, there is provided a light entry exposure opening 14 which defines the maximum available exposure aperture for the system. An objective or taking lens 16 is provided in overlying relation to the light entry opening 14 wherein the objective lens 16 is preferably of the fixed focus type centered about an optical axis 18 for focusing image carrying rays through the light entry exposure opening 14. The image carrying rays are thereafter directed to a rearwardly positioned film plane (not shown) by way of a reflecting mirror (also not shown) all of which are stationed within a suitable light tight film exposure chamber (also not shown) in a manner as is more fully described in U.S. Pat. No. 4,040,072, entitled "Shutter Latch Arrangement Releasable Through Shutter Blade Actuation and Resettable Through Film Advancement", by B. Johnson et al., issued Aug. 2, 1977, in common assignment herewith and now incorporated by reference herein.

Intermediate the objective lens 16 and light entry exposure opening 14, there is provided a shutter blade mechanism comprising two overlapping shutter blade elements 20 and 21 of the so-called "scanning type" which will be subsequently described in greater detail herein. A pair of scene light admitting primary apertures 22 and 24 specially shaped in the manner of this invention are provided respectively in the blade elements 20 and 21 to cooperatively define a variation of effective aperture openings in accordance with simultaneous longitudinal and lateral displacement of one blade element with respect to the other blade element in a manner as is fully described in U.S. Pat. No. 3,942,183, entitled "Camera with Pivoting Blades", by G. Whiteside, issued Mar. 2, 1977, in common assignment herewith and now incorporated by reference herein. The apertures 22 and 24 are specially shaped so as to overlap the light entry exposure opening 14 and define an effective aperture size which varies in the manner of this invention to be subsequently described herein as a function of the position of the blade elements 20 and 21.

Each of the blades 20 and 21 may additionally be configured to have corresponding photocell sweep secondary apertures as is well known in the art which track in a predetermined corresponding relationship with respect to the scene light admitting primary apertures 22 and 24. In the preferred embodiment, the blades 20, 21 include respectively a top pair of dual photocell sweep secondary apertures 26A, 26B and 28A, 28B and a bottom pair of photocell sweep secondary apertures 25 and 27 which sweep over a scene light detecting station shown generally at 31 in a manner as is more fully described in U.S. patent application Ser. No. 156,198, entitled "Method and Apparatus For Selectively Positioning Spectral Filter", by B. Johnson, filed June 3, 1980, in common assignment herewith. The scene light detecting station comprises a photocell 30 in optical alignment with a split lens 33 wherein the top half of the split lens 33, across which the top pair of dual photocell secondary apertures 26A, 26B and 28A, 28B sweep, blocks or absorbs IR frequencies and transmits visible frequencies while the bottom half of the split lens 33, across which the bottom pair of photocell secondary apertures 25 and 27 sweep, transmits only IR frequencies.

Projecting from the baseblock casting 12 at a location spaced laterally apart from the light entry exposure opening 14 is a pivot pin or stud 32 which pivotally and translatably engages elongate slots 34 and 36 formed in respective shutter blade elements 20 and 21. Pin 32 may be integrally formed with the baseblock casting 12 and blade elements 20 and 21 may be retained in engaging relation with respect to the pin 32 by any suitable means such as peening over the outside end of pin 32.

The opposite ends of the blade elements 20 and 21 respectively include extended portions which pivotally connect to a walking beam 38. The walking beam 38, in turn, is disposed for rotation relative to the baseblock casting 12 by pivotal connection to a projecting pivot pin or stud 40 which may be integrally formed with the baseblock casting 12 at a location spaced laterally apart from the light entry exposure opening 14. The walking beam 38 may be pivotally retained with respect to the pin 40 by conventional means such as an E ring (not shown). In the preferred mode, the walking beam 38 is pivotally connected at its distal ends to the shutter blade elements 20 and 21 by respective pin members 42 and 44 which extend laterally outward from the walking beam 38. Pin members 42 and 44 are preferably circular in cross section and extend through respective circular openings in respective shutter blade elements 20 and 21. Thus, the shutter blade elements 20 and 21 provide a blade mechanism with the means for mounting the blade mechanism for movement being provided by the walking beam 38 together with the pivot pin 32.

Drive means are provided for displacing the blade mechanism and include a tractive electromagnetic device in the form of a solenoid 46 employed to displace the shutter blades 20 and 21 with respect to each other and the baseblock casting 12. The solenoid 46 includes an internally disposed cylindrical plunger unit 48 which retracts inwardly into the body of the solenoid upon energization of the solenoid winding. The solenoid plunger 48 includes an end cap 50 at the outside end thereof together with a vertical slot or groove 52 within the end cap 50 for loosely engaging a pin 54 extending outwardly from the walking beam 38. In this manner, the solenoid plunger 48 is affixed to the walking beam 38 so that longitudinal displacement of the plunger 48 will operate to rotate the walking beam about the pivot pin 40 so as to appropriately displace the shutter blades 20 and 21. The drive means may additionally include a tension spring 56 so as to continuously urge the walking beam 38 to rotate in a counterclockwise direction about the pivot pin 40, thereby also continuously urging the blade elements 20 and 21 into positions defining the largest effective primary aperture over the light entry exposure opening 14. As will be readily understood, in some shutter blade arrangements it may be preferable to utilize a compression spring disposed in a well-known manner around the plunger 48 in place of tension spring 56. Thus, with the spring connection herein described, the exposure control system of this invention is biased to continuously urge the shutter blade elements 20 and 21 into an open scene light unblocking orientation.

Figure 2:
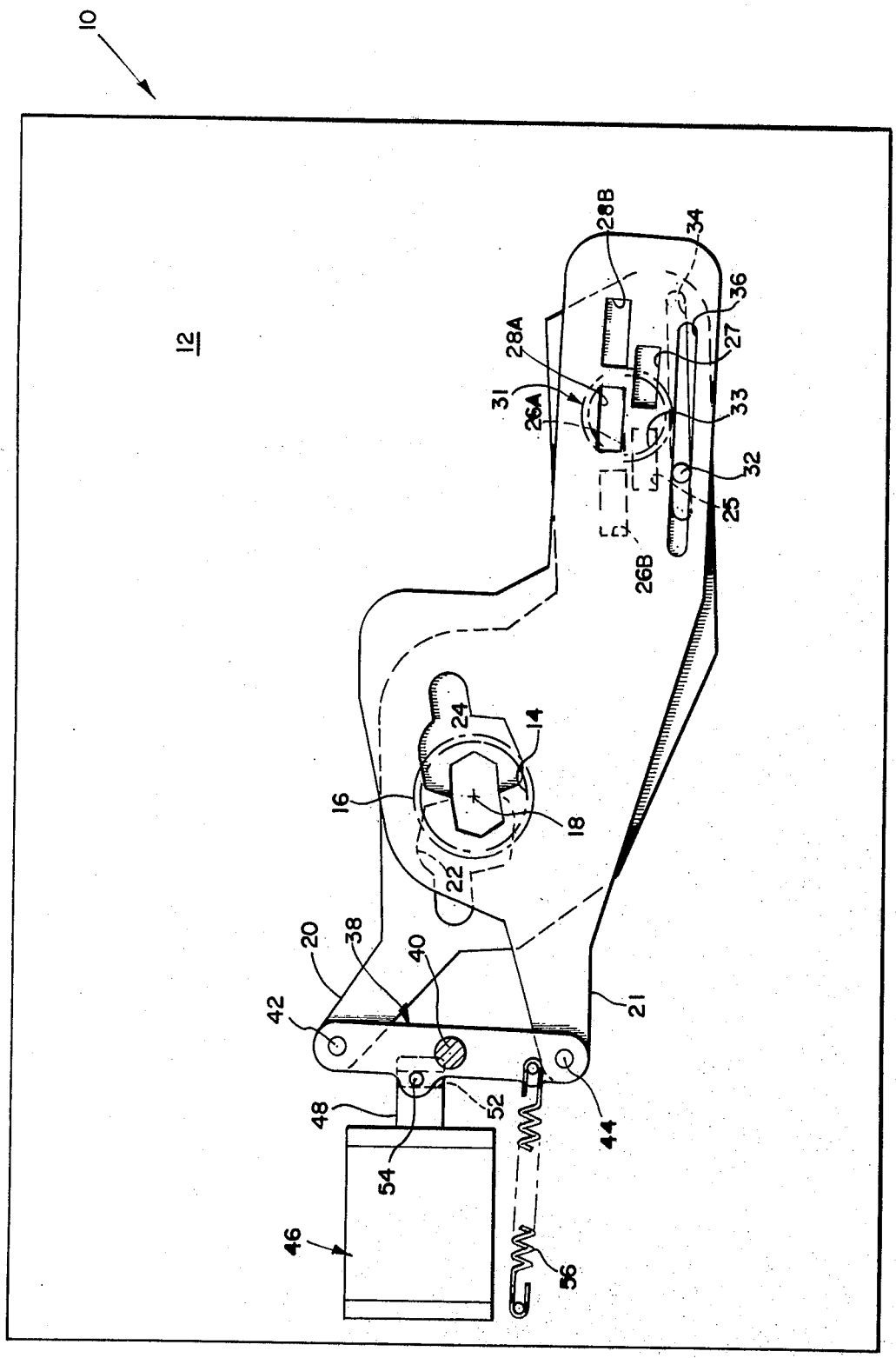
FIG. 2 is a front elevational view showing the shutter blade arrangement of this invention in a different position during its movement from the position of FIG. 1.
Figure 3:
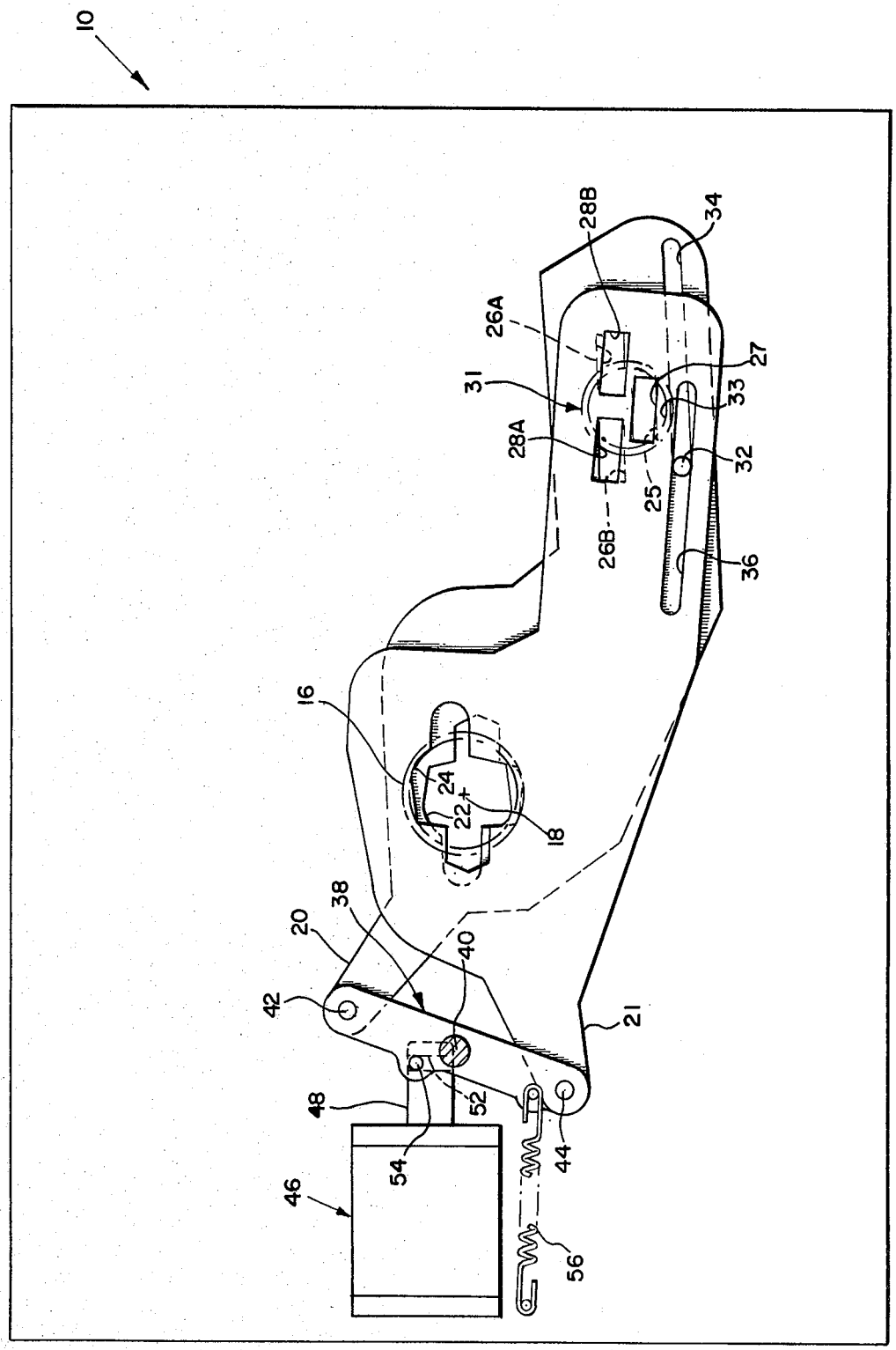
FIG. 3 is a front elevational view showing the shutter blade arrangement of this invention in a different position from its positions of FIGS. 1 and 2.
Figure 4:
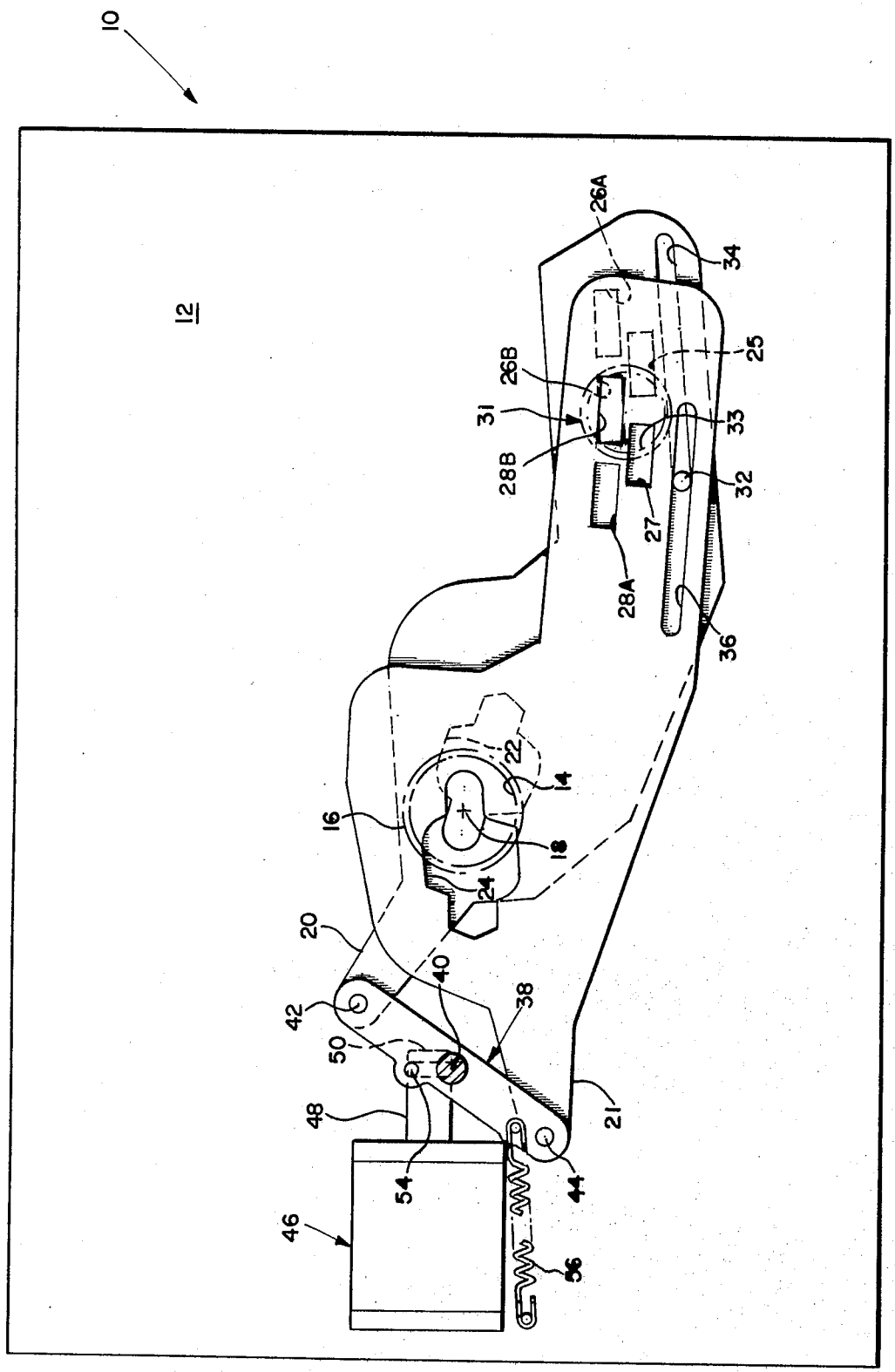
FIG. 4 is a front elevational view showing the shutter balde arrangement of this invention in a different position from its positions of FIGS. 1, 2, and 3.

In the present arrangement, the shutter blades 20 and 21 are drawn from their scene light unblocking open arrangements as shown in FIGS. 2-4 to their scene light blocking closed arrangement as shown in FIG. 1 when the solenoid 46 is energized. Consequently, energization of solenoid 46 prevents the shutter blades 20 and 21 from moving towards their maximum effective primary aperture defining arrangement under the urging of compression spring 56. However, it should be readily understood that the exposure control system of this invention would be equally applicable to photographic systems where the blades 20 and 21 are spring biased in a normally closed position. However, since in the preferred embodiment the shutter blade elements 20 and 21 are spring biased to move toward their scene light unblocking arrangement, it would otherwise be necessary to maintain the solenoid in a state of continued energization in order to hold the shutter blade elements 20 and 21 in their scene light blocking arrangement as shown in FIG. 1. Such continued energization of the solenoid 46, however, would present an intolerable power drain on the camera battery, particularly if the solenoid 46 had to be continuously energized even when the camera apparatus were not in use. In order to avoid this continued energization of the solenoid 46, there is provided a latch mechanism (not shown) which operates normally to latch the shutter blade mechanism in its scene light blocking arrangement as shown in FIG. 1 and which automatically unlatches the shutter blade mechanism to permit the shutter blade elements 20 and 21 to be moved to their scene light unblocking arrangement as shown in FIG. 2 in order to commence a photographic exposure cycle and which further automatically responds at the termination of an exposure cycle to relatch the shutter blade elements 20 and 21 in their scene light blocking arrangement so as to permit the deenergization of the solenoid 46. The manner in which the aforementioned latch operates is more fully described in U.S. Pat. No. 4,040,072 supra.

Figure 5:
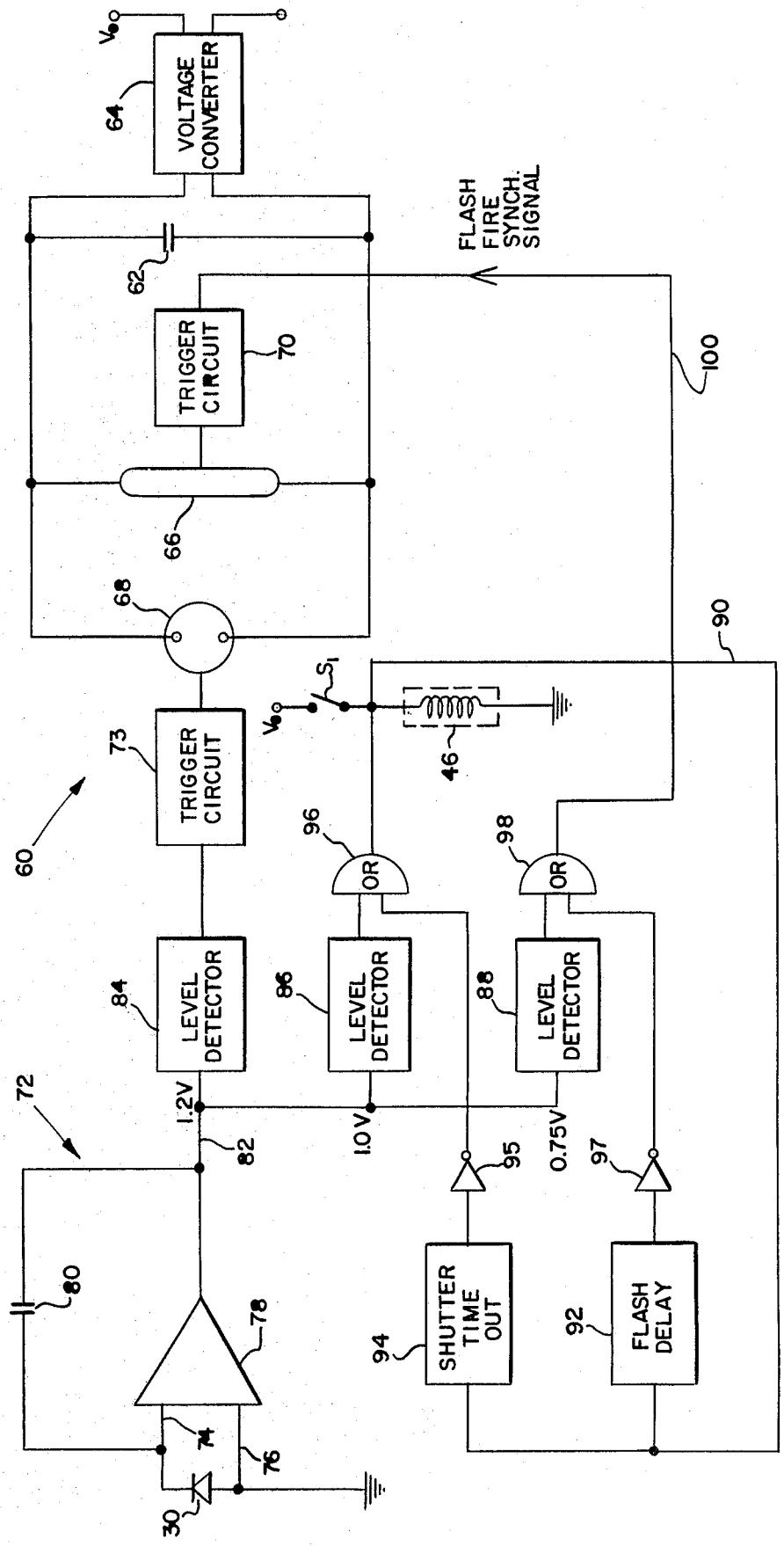
FIG. 5 is a circuit diagram showing an electronic control for the exposure control system of this invention.

Referring now to FIG. 5, there is shown at 60 a schematic wiring diagram for an electronic flash apparatus which may be cooperatively associated with the photographic camera apparatus of this invention to provide artificial illumination in either a predominantly artificial scene lighted mode wherein the ambient scene light intensity is low or in a predominantly ambient scene lighted mode where the ambient scene light is high and the flash contributes only a small proportion, i.e., fill flash, of the scene light admitted by the shutter blade mechanism. The electronic flash apparatus 60 comprises a main storage capacitor 62 which may be charged up to an operating voltage by any conventional voltage converter circuit as shown at 64. The voltage converter 64 operates in a conventional manner to convert a DC voltage, as may be derived from the camera battery (not shown) which can be in the order of 6 volts, to a suitable strobe operating voltage such as 350 volts. A flash tube 66 and a quench tube 68 for interrupting the flash discharge are connected in parallel relation with respect to the storage cpacitor 62. The flash tube 66 can be ignited by a trigger circuit 70 of any conventional form which is set in operation by a flash fire signal to be derived in the following manner. A quench tube 68 may be ignited by another conventional trigger circuit 73 which is connected to respond to a sudden change in the output signal level of a conventional level detector 84 such as a Schmidt trigger.

As shown generally at 72, there is provided a scene light detecting and integrating control circuit comprising the photoresponsive element 30 connected across the input terminals 74 and 76 of an operational amplifier 78 of the differential variety. When considered ideally, the amplifier 78 has an infinite gain and an infinite input impedance and a zero output impedance. The input circuitry of the amplifier 78, however, is structured such that the apparent input impedance for that "scene" by the photoresponsive element 30 is substantially zero, thereby functioning in a manner which permits the photoresponsive element 30 to operate in a current mode. Consequently, the current generated by the photoresponsive element 30 is limited substantially only to its own internal impedance. To accomplish this effect, a feedback capacitor 80 is connected between one input terminal 74 of the operational amplifier 78 and an output terminal 82 from the operational amplifier 78.

With the feedback arrangement described, any difference of potential supplied by the photoresponsive element 30 across input terminals 74 and 76 will operate to cause a current of opposite polarity to be produced through feedback capacitor 80. As a consequence, the feedback capacitor 80 provides a substantially instantaneous feedback signal of opposite polarity which serves to counteract any differential signal voltage impressed by the photoresponsive element 30 across the input terminals 74 and 76. Thus, although the amplifier 78 has a very high input impedance, the photoresponsive element 30, when connected in the aforementioned manner, experiences only a very low input impedance to the amplifier 78. Therefore, the current output of the photoresponsive element 30 is directed into the feedback capacitor 80. In this manner, the photoresponsive element 30 is connected to operate in a constant current mode of operation under conditions of non-varying scene light intensity to provide a substantially linear output response at output terminal 82 as is more fully described in U.S. Pat. No. 3,620,143, entitled "Automatic Exposure Control System with Fast Linear Response", by J. Burgarella, issued Nov. 16, 1971, in common assignment herewith and now incorporated by reference herein in its entirety.

The output signal from the light integrator circuit 72 is directed to three level detector circuits 84, 86, 88 which all may be of a well-known design such as a Schmidt trigger. As previously discussed, the output from the level detector 84 controls the quench trigger circuit 73 of the electronic flash 60. The output signal from the level detector 86 is directed to an OR gate 96 which, in turn, provides an output signal to control the energization of the solenoid 46. The output signal from the level detector 88 is directed to an OR gate 98 which, in turn, provides an output signal along line 100 to control the flash fire trigger circuit 70. For purposes of illustration, level detector 86 is configured to trigger at 1.0 volt, which is a normalized value representative of a select or optimum film exposure value for a predetermined film speed. Level detector 84 is set to trigger at 1.2 volts, and level detector 88 is set to trigger at 0.75 volts for reasons which will become apparent from the following discussion. Again, the 1.2 volt and 0.75 volt trigger levels represent normalized values.

A flash time delay circuit as shown generally at 92 receives an input signal by way of a line 90 upon the deenergization of the solenoid 46 to provide a time delayed output signal which is inverted by an inverter 97 and thereafter directed to the other input terminal of the OR gate 98. The time delay provided by the circuit 92 is selected to coincide with the blade movement to its maximum effective primary scene light admitting aperture size defining position in a manner to be fully described in the following discussion. In like manner, a shutter time out circuit as shown generally at 94 receives an input signal upon the deenergization of the solenoid 46 to provide a time delayed output signal which is inverted by an inverter 95 and thereafter directed to the other input terminal of the OR gate 96. The time delay provided by the circuit 94 is of sufficient duration to provide a time exposure under conditions of low ambient scene light where the photographic subject is located beyond the effective range of the flash in a manner as will also be more fully described in the following discussion.

Assuming that the electronic flash 60 has been fully charged by turning on the voltage converter 64, an automatic photographic exposure cycle may be commenced in the usual manner by manually actuating a photographic cycle initiation button (not shown) which operates, in turn, to energize the solenoid 46 and release the shutter blade latch mechanism (not shown) in the manner as is fully described in U.S. Pat. No. 4,040,062 supra. The photographic exposure cycle is subsequently commenced automatically upon the opening of the switch $S_1$ to deenergize the solenoid 46 and release the shutter blade elements 20 and 21 for movement from the scene light blocking arrangement of FIG. 1 toward the scene light unblocking arrangements of FIGS. 2–4. The shutter blade elements 20 and 21 are thus moved by the walking beam 38 and tension spring 56 in directions which operate to change the effective scene light admitting primary aperture defined by the overlapping apertures 22, 24 over the light entry exposure opening 14 in a manner as shown graphically in FIG. 6 where the normalized areas for the range of effective primary scene light admitting apertures is plotted as a function of elapsed time from blade release. Rotation of the walking beam 38 as previously discussed, effects a simultaneous linear and angular movement of the shutter blade elements 20 and 21 about the pivot pin 32 so that the photocell sweep secondary apertures 26A, 26B, 28A, 28B and 25, 27 define corresponding series of changing effective photocell sweep apertures over the photoresponsive element 30 in a manner as also illustrated by the graph of FIG. 6.

Figure 6:
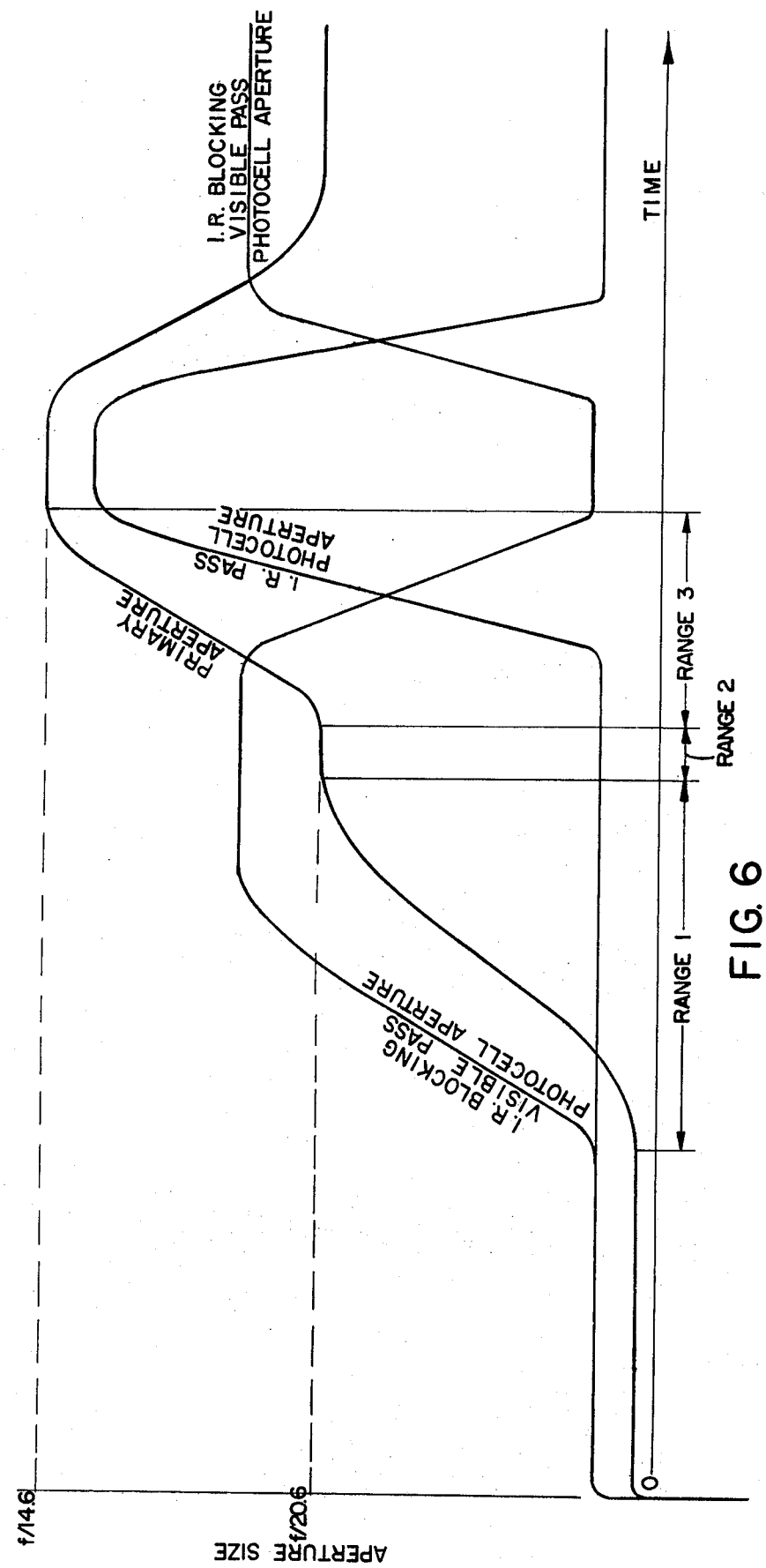
FIG. 6 is a graphical representation showing the variation in primary scene light admitting aperture size and in secondary photocell sweep aperture size versus time from the release of the shutter blade elements to commence the exposure interval.

Since the shutter blade elements 20 and 21 are driven at a nearly constant speed by the tension spring 56, the size of the effective scene light admitting primary aperture defined by the overlapping apertures 22 and 24 progressively enlarges through a first range of apertures at a predetermined average rate until reaching an intermediate aperture size (f/20.6) as shown in FIG. 2 and in the graph of FIG. 6. As is readily apparent from the graph of FIG. 6, in the preferred embodiment, the instantaneous rate of aperture increase varies throughout the first range preferably starting with an ever increasing rate and then trailing off to an ever decreasing rate at the end of the first range. Continued movement of the shutter blade elements 20 and 21 result in the size of the effective scene light admitting aperture defined by the overlapping apertures 22 and 24 remaining substantially constant at f/20.6 to define a second range as shown in the graph of FIG. 6 where the predetermined average rate of aperture increase is substantially less than the predetermined average rate of aperture increase for the first range. For the preferred embodiment, the average rate of aperture increase in the second range is zero thereby maintaining a constant f/20.6 aperture. The average predetermined rate of increase for the size of the effective scene light admitting primary aperture thereafter substantially increases through a third range until reaching a maximum size effective aperture as shown in FIG. 3 and in the graph of FIG. 6 at f/14.6. Again, as is readily apparent from the graph of FIG. 6, in the preferred embodiment, the instantaneous rate of aperture increase varies throughout the third range preferably starting with an ever increasing rate and then trailing off to an ever decreasing rate at the end of the third range. Continued movement of the shutter blade elements 20 and 21 under the biasing influence of the tension spring 56 operates to thereafter progressively decrease the size of the effective scene light admitting primary aperture defined by the overlapping apertures 22 and 24 until reaching another intermediate sized aperture as shown in FIG. 4 and in the graph of FIG. 6 at f/20.6.

Displacement of the shutter blade elements 20 and 21 in the aforementioned manner also results initially in the top leading photocell sweep secondary apertures 26A and 28A being moved into overlapping relation as shown in FIG. 2 so as to transmit scene light to the photocell 30 by way of the top half of the split lens 33 and thereby block IR frequencies from reaching the photocell 30. As is now readily apparent, the time during which the top leading photocell sweep secondary apertures 26A and 28A overlap to block the transmission of IR frequencies to the photocell 30 corresponds with the time of initial progressive enlargement of the effective scene light admitting primary aperture from its scene light blocking position (FIG. 1) to its intermediate effective primary aperture defining position of f/20.6 (FIG. 2). Continued movement of the shutter blade elements 20 and 21 in the aforementioned manner results in the top photocell sweep secondary apertures 26A and 28A moving out of overlapping relation as shown in FIG. 3 to block the transmission of scene light to the photocell 30 by way of the top IR frequency blocking half of the split lens 33. However, at the same time the bottom photocell apertures 25 and 27 overlap (FIG. 3) to define a maximum size effective photocell sweep secondary aperture to transmit scene light by way of the bottom half of the split lens 33 to the photocell 30 thereby admitting IR frequency scene light to the photocell. Thus, when the effective scene light admitting primary aperture is at its maximum size at f/14.6, the effective photocell sweep secondary apertures transmit a maximum of scene light in both the IR and visible frequencies. Continued displacement of the shutter blade elements 20 and 21 in the aforementioned manner results in the top trailing photocell sweep secondary apertures 26B and 28B overlapping as shown in FIG. 4 to again transmit scene light by way of the top half of the split lens 33 and thereby block the passage of IR scene light to the photocell 30. At the same time, the bottom photocell sweep secondary apertures 25 and 27 are moved out of overlapping relation with respect to each other so as to block the transmission of IR frequency scene light to the photocell 30 by way of the bottom half of the photocell lens 33. Thus, when the effective scene light admitting primary aperture is reduced from its maximum aperture size of f/14.6 (FIG. 3) to its intermediate aperture size of f/20.6 (FIG. 4), the effective photocell sweep secondary aperture is defined by the overlapping top trailing photocell sweep secondary apertures 26B and 28B.

Under conditions of high ambient scene light intensity where the camera operates in a predominantly ambient scene lighted mode, the photoresponsive element 30 provides a time varying response corresponding to the intensity of scene light incident thereon as the shutter blade elements are moved from their scene light blocking position as shown in FIG. 1 toward their intermediate aperture size defining position as shown in FIG. 2. The feedback capacitor 80 operates in conjunction with the operational amplifier 78 and photoresponsive element 30 to provide an output signal which is representative of the time integration of the scene light intensity incident to the photoresponsive element 30. When the scene light integration signal reaches 0.75 volts, the level detector 88 is triggered to provide an assertive (binary logic level 1) output signal to the OR gate 98, so as to switch the OR gate 98 and provide an assertive (binary logic level 1) output signal level to trigger the flash trigger circuit 70 thereby firing the flash tube 66 in a well-known manner.

If the photographic subject is within the effective range of the flash, there will be provided an immediate and substantial increase in the reflected scenelight directed to the photoresponsive element 30. The photoresponsive element 30 and its associated light integrating circuit 72 will respond immediately to this increase of artificial scene light to provide the required voltages to trigger the level detectors 84 and 86. The level detector 86 thus provides an assertive (binary logic level 1) output signal level to the OR gate 96 so as to switch the OR gate 96 and provide an assertive output signal sufficient to effect the reenergization of the solenoid 46. The plunger 48 is thereby retracted and operates to rotate the walking beam 38 in a counterclockwise direction back to the scene light blocking arrangement as shown in FIG. 1 in order to terminate the exposure interval.

Since the rate of scene light integration becomes so steep subsequent to the firing of the flash 66, the level detector 84 is triggered almost simultaneously with the level detector 86 and provides an assertive (binary logic level 1) output signal to trigger the quench trigger circuit 73 so as to fire the quench tube 68 and terminate the artificial light provided by the flash tube 66. In this manner, there can be provided an artificial flash light contribution to the selected film exposure value of approximately 25 percent as fully described in U.S. patent application Ser. No. 74,993, entitled "Camera with Proportional Fill Flash Quench Strobe", by B. Johnson, filed Sept. 13, 1979, in common assignment herewith. Thus, when the photographic subject is located within the maximum effective range of the flash 66, there is provided a photographic exposure embodying a controlled amount of flash illumination regardless of the level of ambient scene light present.

Under conditions where the ambient scene light intensity is greater than 50 c/ft.$^2$, the solenoid 46 will be reenergized to close the shutter blades 20 and 21 prior to the effective primary aperture increasing beyond the second range of apertures (f/20.6) as shown in the graph of FIG. 6. Since the depth of field increases in correspondence with a decrease in maximum effective exposure aperture, it becomes readily apparent that the exposure control system of this invention can provide for an increased depth of field for the predominantly ambient scene lighted exposure mode where the solenoid 46 is energized to close the blade mechanism either prior to the blade mechanism reaching the f20.6 aperture size position or at the f/20.6 aperture size position as shown in the graph of FIG. 6. This increased depth of field for the predominantly ambient scene lighted mode of operation is of particular advantage in a fixed focus camera.

Also, as previously discussed, during the early stages of blade displacement up to a maximum effective exposure aperture of f/20.6, only visible light will be incident upon the photocell 30 as a result of the top leading photocell sweep secondary apertures 26A and 28A overlapping to absorb IR frequencies from the scene light transmitted by way of the top half of the split lens 33 to the photocell 30. In this manner, outdoor daylight scenes where background chlorophyll reflects substantial IR frequency radiation may be better exposed with regard to human subjects since the photocell receives primarily visible frequency scene light.

Under conditions of low ambient scene light intensity of less than 15 to 20 c/ft$^2$, the light integrator circuit 72 will not provide a 0.75 volt output response prior to the expiration of the time delay provided by the flash delay circuit 92. Instead, the zero volt signal level at line 90 will be transmitted by the flash delay circuit 92 at the expiration of the time delay provided by the flash delay circuit 92 and inverted by the inverter 97 to provide an assertive (binary logic level 1) output signal to the OR gate 98 so as to switch the OR gate 98 and provide the flash fire signal in the aforementioned manner. The delay time provided by the flash delay circuit 92 is synchronized to the shutter blade displacement so as to provide the flash fire signal when the shutter blade elements 20 and 21 reach their maximum effective scene light admitting primary aperture defining position as shown in FIG. 3 and in the graph of FIG. 6 at f/14.6. Again, if the photographic subject is within the effective range of the flash, there will be provided an immediate and substantial increase in the reflected scene light directed to the photoresponsive element 30. The photoresponsive element 30 and its associated light integrating circuit 72 will respond immediately to this increase of artificial scene light to provide the required voltages to trigger the level detectors 84 and 86. The level detector 86 thus provides an assertive (binary logic level 1) output signal level to the OR gate 96 so as to switch the OR gate 96 and provide an assertive output signal sufficient to effect the reenergization of the solenoid 46. The plunger 48 is thereby retracted and operates to rotate the walking beam 38 in a counterclockwise direction back to the scene light blocking arrangement as shown in FIG. 1 in order to terminate the exposure interval.

Since the rate of scene light integration becomes so steep subsequent to the firing of the flash 66, the level detector 84 is triggered almost simultaneously with the level detector 86 and provides an assertive (binary logic level 1) output signal to trigger the quench trigger circuit 73 so as to fire the quench tube 68 and terminate the artificial light provided by the flash 66. Thus, in a predominantly artificial scene lighted mode, there is provided a maximum size effective scene light admitting primary aperture in the manner of this invention so as to effectively extend the range of the flash without effecting the depth of field for the aforementioned predominantly ambient scene lighted mode of operation. In addition, since rate of change for the size of the effective scene light admitting primary aperture is so steep from between f/20.6 and f/14.6, there is provided a quick change from the maximum size of the primary aperture in the predominantly ambient scene lighted mode to the maximum size of the primary aperture in the predominantly artificial scene lighted mode. This quick change from the f/20.6 aperture size to the f/14.6 aperture size also provides a secondary benefit during camera manufacture in that it provides a readily detectable instant during the exposure interval from which the flash fire signal may be timed to assure its provision at the f/14.6 maximum effective primary aperture size defining position.

As previously discussed, when the shutter blade elements 20 and 21 are displaced to their maximum size effective scene light admitting primary aperture defining position as shown in FIG. 3, the top leading photocell sweep secondary apertures 26A and 28A move out of overlapping relation with respect to each other to block the transmission of scene light to the photocell 30 by way of the top IR frequency blocking half of the split lens 33 and the bottom photocell apertures 25 and 27 overlap to define a maximum size effective photocell sweep secondary aperture which transmits scene light to the photocell 30 by way of the bottom IR frequency passing half of the split lens 33. Thus, the exposure and flash duration are controlled primarily as a function of IR frequency scene light reflected from the photographic subject. Since scene light reflectivities generally vary under conditions of artificial scene light, it becomes highly desirable to evaluate the IR radiation since there is less reflectivity differences for the IR radiation. Since the IR radiation reflectivity differences will be less between, for example, a subject's facial skin and the surrounding clothing or other objects, there may be provided a more uniform exposure in the predominantly artificial scene lighted mode of operation.

Under conditions where the photographic subject is beyond the effective range of the flash, there will not be provided an immediate and substantial increase in the reflected scene light directed to the photoresponsive element 30 to trigger the level detector 86. The shutter blade elements 20 and 21 will thus continue to be displaced from the maximum size effective scene light admitting primary aperture defining position of FIG. 3 to the intermediate size effective scene light admitting primary aperture defining position as shown in FIG. 4. After a suitable time elapses for a time exposure photograph, the shutter time-out circuit 94 will switch from a high (binary logic 1) output signal level to a low (binary logic 0) output signal level which will be subsequently inverted by the gate 95 to switch the OR gate 96 to a positive (binary logic 1) output signal level sufficient to effect the reenergization of the solenoid 46. The plunger 48 is thereby retracted and operates to rotate the walking beam 38 in a counterclockwise direction back to the scene light blocking arrangement as shown in FIG. 1 in order to terminate the timed exposure interval. Thus, under conditions where the available ambient scene light is low, i.e., less than 15 to 20 c/ft.$^2$ and the photographic subject is located beyond the effective range of the source of artificial illumination, there is provided a time exposure at an intermediate aperture size (f/20.6) wherein the depth of field is again maximized in a manner similar to that of the aforementioned predominantly ambient scene lighted mode of operation.

Also, as is now readily apparent, the displacement of the shutter blade elements 20 and 21 to the aperture defining position of FIG. 4 also results in the top trailing photocell sweep secondary apertures 26B and 28B overlapping to again transmit scene light by way of the top half of the split lens 33 and thereby block the passage of IR scene light to the photocell 30. At the same time the bottom photocell sweep secondary apertures 25 and 27 are moved out of overlapping relation with respect to each other so as to block the transmission of IR frequency scene light to the photocell by way of the bottom half of the photocell lens 33. Thus, in the aforementioned time exposure mode of operation where the photographic subject is located beyond the effective range of the source of artificial illumination and any exposure is due primarily to whatever ambient scene light there is such as street lights, etc., the photocell is controlled only by visible light with the IR frequencies being blocked for the same reasons as previously discussed with regard to the predominantly ambient scene lighted mode of operation.

Although the aforementioned primary scene light admitting apertures have been defined as progressively changing first to an intermediate size aperture and then to a maximum size aperture and then back to an intermediate size aperture as the blades are displaced in the same direction along a predetermined path, it will be readily apparent that the apertures may also be configured to provide only the maximum size aperture without thereafter reducing in size for the time exposure. Thus, since certain changes may be made in the above-described system and apparatus without departing from the scope of the invention herein involved, it is intended that all matter contained in the description thereof or shown in the accompanying drawings shall be interpreted as illustrative and not in a limiting sense.

What is claimed is:

1. A photographic camera apparatus of the type for use with a source of artificial illumination in either a predominantly ambient scene lighted mode or in a predominantly artificial scene lighted mode and which includes means for mounting photographic film material at a given film plane comprises:
a blade mechanism;
means for mounting said blade mechanism for displacement along a predetermined path to define a range of differently sized apertures;
means for providing a flash fire signal to ignite the source of artificial illumination at a time subsequent to the commencement of an exposure interval; and
drive means for displacing said blade mechanism along said predetermined path to define the exposure interval, said blade mechanism and said drive means being cooperatively structured and arranged with respect to each other such that, for the predominantly ambient scene lighted exposures where the ambient scene light is above a select level, said drive means first displaces said blade mechanism from a first closed arrangement wherein it precludes scene light from reaching the film plane toward a second arrangement defining a maximum size aperture in said range of apertures and then displaces said blade mechanism back toward its said first closed arrangement prior to said blade mechanism being displaced beyond a third intermediate arrangement wherein it defines an aperture size substantially less than said maximum aperture size, and such that for the predominantly artificial scene lighted exposures said drive means first displaces said blade mechanism from its said first arrangement to its said second arrangement at said flash fire signal time and then displaces said blade mechanism back to its said closed arrangement wherein the rate at which said aperture sizes increase immediately prior to said blade mechanism being displaced into its said third arrangement from its said first arrangement is substantially less than the rate at which said aperture sizes increase immediately subsequent to said blade mechanism being displaced away from its said third arrangement toward its said second arrangement.

2. The photographic camera of claim 1 including means for detecting scene light in correspondence to the scene light admitted to the film plane by said blade mechanism as it moves along said predetermined path to define said range of differently sized apertures and for providing an output signal corresponding to a select exposure value wherein said drive means responds to said output signal to displace said blade mechanism from any position along its said predetermined path back to its said first blocking arrangement.

3. The photographic camera of claim 2 including means for admitting a first selected range of spectral frequencies of scene light to said detecting means in general correspondence with the displacement of said blade mechanism from its said first closed arrangement to its said third arrangement, and for admitting a second selected range of spectral frequencies of scene light to said detecting means in general correspondence with the displacement of said blade mechanism from its said third arrangement to its said second arrangement.

4. The photographic camera of claim 1 wherein: said blade mechanism includes a pair of overlapping shutter blade elements having respective primary apertures therethrough which cooperatively define said range of differently sized apertures during blade displacement in generally opposing directions along said predetermined path, said drive means operates to displace said shutter blade elements at substantially constant speed along said predetermined path, and said primary apertures are configured to provide said difference in the rate at which said aperture size increases immediately prior to said shutter blade elements being displaced into its said third arrangement and immediately subsequent to said shutter blade elements being displaced away from its said third arrangement.

5. The photographic camera of claim 4 including means for detecting scene light and for admitting scene light to said detecting means in correspondence to the scene light admitted to the film plane by said primary apertures as said shutter blade elements move along said predetermined path to define said range of differently sized apertures, said scene light admitting means comprising at least a pair of overlapping secondary apertures through said shutter blade elements respectively and said detecting means further including means for providing an output signal corresponding to a select exposure value wherein said drive means responds to said output signal to displace said blade mechanism from any position along its said predetermined path back to its said first blocking arrangement.

6. The photographic camera of claim 5 wherein said secondary apertures are configured to cooperate with spectral filters to admit a first selected range of spectral frequencies of scene light to said detecting means in general correspondence with the displacement of said blade mechanism from its said first closed arrangement to its said third arrangement, and to admit a second selected range of spectral frequencies of scene light to said detecting means in general correspondence with the displacement of said blade mechanism from its said third arrangement to its said second arrangement.

7. The photographic camera apparatus of claim 1 wherein said drive means operates to displace said blade mechanism from its said second arrangement to a fourth arrangement wherein said blade mechanism defines an aperture size substantially less than said maximum aperture size and then displaces said blade mechanism back to its said closed arrangement in order to provide a predominantly ambient scene lighted exposure under conditions where the scene is beyond the effective range of the source of artificial illumination.

8. The photographic camera of claim 7 including means for detecting scene light in correspondence to the scene light admitted to the film plane by said blade mechanism as it moves along said predetermined path to define said range of differently sized apertures and for providing an output signal corresponding to a select exposure value wherein said drive means responds to said output signal to displace said blade mechanism from any position along its said predetermined path back to its said first blocking arrangement.

9. The photographic camera of claim 8 including means for admitting a first selected range of spectral frequencies of scene light to said detecting means in general correspondence with the displacement of said blade mechanism from its said first closed arrangement to its said third arrangement, for admitting a second selected range of spectral frequencies of scene light to said detecting means in general correspondence with the displacement of said blade mechanism from its said third arrangement to its said second arrangement, and for admitting said first selected range of spectral frequencies of scene light to said detecting means in general correspondence with the displacement of said blade mechanism from its said second arrangement to its said fourth arrangement.

10. The photographic camera of claim 7 wherein: said blade mechanism includes a pair of overlapping shutter blade elements having respective primary apertures therethrough which cooperatively define said range of differently sized apertures during blade displacement in generally opposing directions along said predetermined path, said drive means operates to displace said shutter blade elements at substantially constant speed along said predetermined path, and said primary apertures are configured to provide said difference in the rate at which said aperture size increases immediately prior to said shutter blade elements being displaced into its said third arrangement and immediately subsequent to said shutter blade elements being displaced away from its said third arrangement.

11. The photographic camera of claim 10 including means for detecting scene light and for admitting scene light to said detecting means in correspondence to the scene light admitted to the film plane by said primary apertures as said shutter blade elements move along said predetermined path to define said range of differently sized apertures, said scene light admitting means comprising at least a pair of overlapping secondary apertures through said shutter blade elements respectively and said detecting means further including means for providing an output signal corresponding to a select exposure value when said drive means responds to said output signal to displace said blade mechanism from any position along its said predetermined path back to its said first blocking arrangement.

12. The photographic camera of claim 11 wherein said secondary apertures are configured to cooperate with spectral filters to admit a first selected range of spectral frequencies of scene light to said detecting means in general correspondence with the displacement of said blade mechanism from its said first closed arrangement to its said third arrangement, to admit a second selected range of spectral frequencies of scene light to said detecting means in general correspondence with the displacement of said blade mechanism from its said third arrangement to its said second aperture defining arrangement, and to admit said first selected range of spectral frequencies of scene light to said detecting means in general correspondence with the displacement of said blade mechanism from its said second arrangement to its said fourth arrangement.

13. A photographic camera apparatus of the type for use with a source of artificial illumination and which includes means for mounting photographic film material at a given film plane comprising:

a blade mechanism;

means for mounting said blade mechanism for displacement between a first closed arrangement wherein it precludes scene light from reaching the film plane, a second maximum aperture defining arrangement and a third intermediate aperture defining arrangement;

means for providing a flash fire signal to ignite the source of artificial illumination, under conditions of insignificant ambient light level, when the blade mechanism is in its said second maximum aperture defining position;

means for detecting scene light in correspondence with the scene light admitted to the film plane by said blade mechanism and for providing a select output signal upon detection of sufficient scene light to provide a select exposure; and drive means for initially displacing said blade mechanism from its said first closed arrangement to its said second arrangement and thereafter responding to said select signal for displacing said blade mechanism back to its said first arrangement to define an exposure interval, said drive means alternately responding in the absence of said select signal to displace said blade mechanism to its said third arrangement for a predetermined period of time and thereafter displacing said blade mechanism back to its said first arrangement to define an exposure interval, whereby the depth of field of photographic exposures effected in the absence of said select signal is increased.

14. The photographic camera apparatus of claim 13 wherein the flash unit is an electronic flash unit integral to said apparatus and said drive means initially displaces said blade mechanism from its said first closed arrangement through a first range wherein the apertures defined by said blade mechanism progressively increase at a first predetermined average rate, then through a second range wherein the apertures defined by said blade mechanism vary in size at a predetermined average rate substantially less than said first predetermined average rate and thereafter through a third range, until said blade mechanism is in its said maximum aperture defining position, wherein the apertures defined by said blade mechanism increase at a second predetermined average rate substantially greater than said predetermined average rate at which they vary in said second range, whereby said photographic apparatus is adapted to provide relatively small aperture value exposures over an extended range of ambient scene light conditions.

* * * * *